US007949513B2

(12) United States Patent
Williams

(10) Patent No.: US 7,949,513 B2
(45) Date of Patent: May 24, 2011

(54) LANGUAGE MODULE AND METHOD FOR USE WITH TEXT PROCESSING DEVICES

(75) Inventor: Roland E. Williams, Pleasant Hill, CA (US)

(73) Assignee: ZI Corporation of Canada, Inc., Calgary (CA)

( * ) Notice: Subject to any disclaimer, the term of this patent is extended or adjusted under 35 U.S.C. 154(b) by 1329 days.

(21) Appl. No.: 10/055,594

(22) Filed: Jan. 22, 2002

(65) Prior Publication Data

US 2003/0144830 A1    Jul. 31, 2003

(51) Int. Cl.
*G06F 17/20* (2006.01)
(52) U.S. Cl. .................. 704/1; 704/9; 704/257
(58) Field of Classification Search .................. 715/536; 704/231, 246, 251, 257, 275, 232, 270, 258, 704/235, 270.1, 1–10; 707/4
See application file for complete search history.

(56) References Cited

U.S. PATENT DOCUMENTS

| 5,528,235 A | | 6/1996 | Lin et al. | |
|---|---|---|---|---|
| 5,960,384 A | * | 9/1999 | Brash | 704/9 |
| 6,195,636 B1 | * | 2/2001 | Crupi et al. | 704/231 |
| 6,208,971 B1 | * | 3/2001 | Bellegarda et al. | 704/275 |
| 6,243,675 B1 | * | 6/2001 | Ito | 704/232 |
| 6,311,180 B1 | * | 10/2001 | Fogarty | 707/4 |
| 6,393,403 B1 | * | 5/2002 | Majaniemi | 704/275 |
| 6,415,257 B1 | * | 7/2002 | Junqua et al. | 704/275 |
| 6,513,006 B2 | * | 1/2003 | Howard et al. | 704/257 |
| 6,539,358 B1 | * | 3/2003 | Coon et al. | 704/275 |
| 6,623,529 B1 | * | 9/2003 | Lakritz | 715/536 |
| 6,868,383 B1 | * | 3/2005 | Bangalore et al. | 704/254 |
| 2002/0128832 A1 | * | 9/2002 | Smith | 704/231 |

* cited by examiner

*Primary Examiner* — Huyen X. Vo
(74) *Attorney, Agent, or Firm* — Michael A. Glenn; Glenn Patent Group

(57) ABSTRACT

A verbal interface appliance uses an attachable language-specific processing module to perform language-specific tasks. The language module implements an API by which the appliance can submit language-specific processing requests. The appliance submits data representing a user input gesture and receives both data representing appropriate feedback to the user in the language implemented by the language module and one or more candidates selected as likely interpretations of the user's input gesture. The language module also provides font data lookup service to the appliance. The language module can support more than one written language and can support more than one textual input mode.

10 Claims, 9 Drawing Sheets

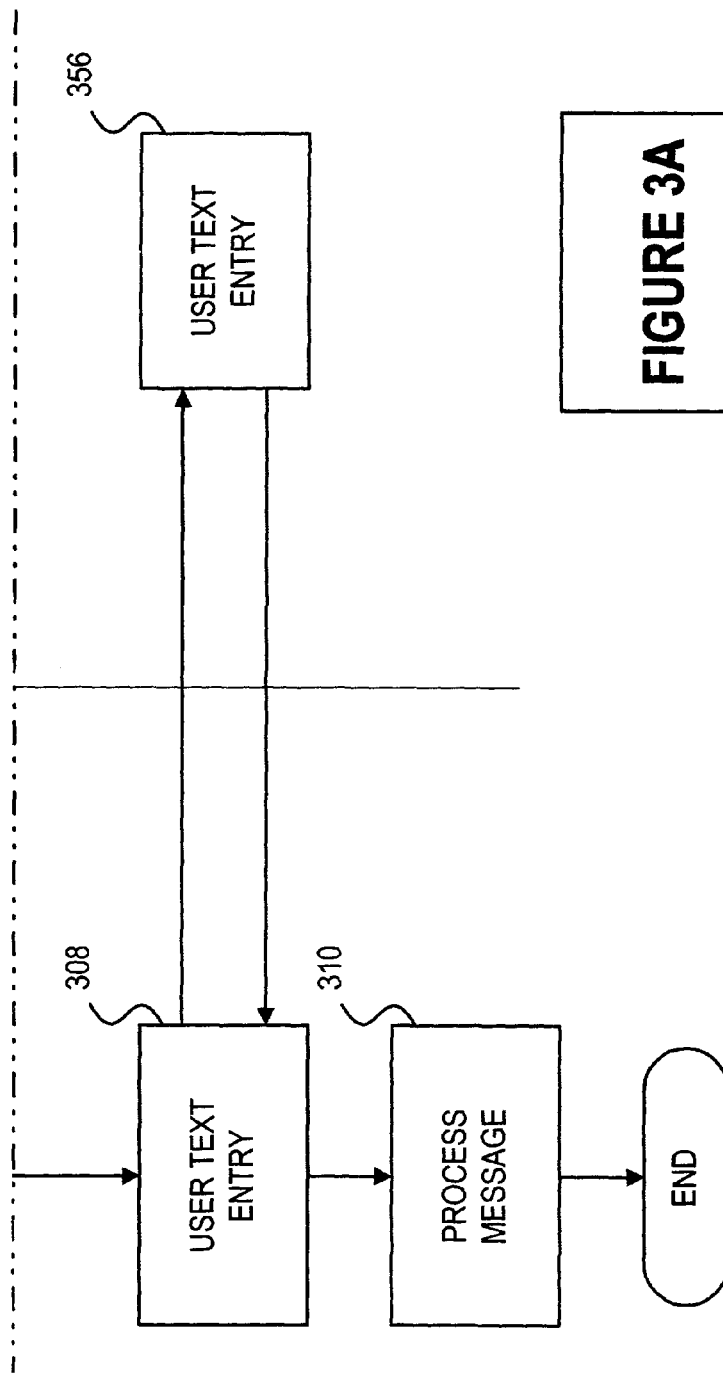
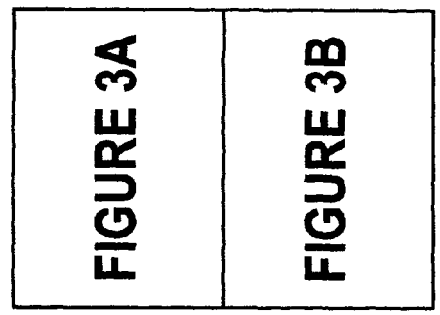
FIGURE 3B
FIGURE 3

LANGUAGE MODULE AND METHOD FOR USE WITH TEXT PROCESSING DEVICES

FIELD OF THE INVENTION

This invention relates to the field of text entry in electronic devices, and more specifically to language module which can be coupled to a text processing device and which supports a particular human written language on behalf of the device.

BACKGROUND OF THE INVENTION

In a wide variety of products, particularly electronic products, text interfaces pose a number of problems. One problem is that of limited processing resources in such products to accommodate new text interfaces. Another problem pertains to loss of economies of scale when producing nearly identical products with different text interfaces. Such problems frequently arise in the context of producing text interfaces for various markets with different languages.

As an example, it is useful to consider text entry in a mobile telephone. Frequently, text entry logic is implemented in a telephone in which processing resources are already used near capacity. Accordingly, any changes to accommodate different text entry features such as a different written language frequently exceed the processing and/or storage capacity of the mobile telephone. For example, written English uses generally the 26-letter Latin alphabet (upper- and lowercase), ten (10) numerical digits, and several symbols. A few hundred characters are more than sufficient to adequately represent any written expression in English. However, anywhere from nearly 7,000 to over 15,000 characters are required to adequately represent written expressions in the Chinese language. As used herein, a character is any symbol used in written language and includes, for example, letters, numerals, and ideographs.

Considering the example of a text interface for a mobile phone further, people use mobile telephones to communicate in a wide variety of languages. For example, Zi Corporation of Alberta, Canada (http://www.zicorp.com) advertises that their eZiText™ text interface is available in 32 different languages. To implement each language in a mobile telephone, different models of telephone generally must be produced for each specific language. Such can be accomplished, for example, by programming PROMs within each telephone with logic specific to a particular language for which the telephone is intended. Therefore, to implement all 32 languages, 32 different production runs of mobile telephones must be made. Some text-interface device manufacturers may decline to serve a number of potential markets, leaving those markets unserved and forfeiting some potential profits. In addition, once a product is produced for a particular language, that product is no longer useful in other markets in which other languages are used for text interfaces.

Accordingly, what is needed is a mechanism by which various languages can be easily integrated into text-interface devices without taxing already taxed processing resources and without requiring separate production of distinct models for different languages.

SUMMARY OF THE INVENTION

In accordance with the present invention, an appliance uses an attachable language-specific processing module to perform language-specific tasks. For example, the language module can be a Subscriber Identification Module (SIM) card used with a mobile telephone. The language module implements an API by which the appliance can submit language-specific processing requests.

In general operation, the appliance submits data representing a user input gesture and eventually receives both data representing appropriate feedback to the user in the language implemented by the language module and one or more candidates selected as likely interpretations of the user's input gesture. For example, if the language module implements entering of Chinese text using stroke category key input, the appliance submits data representing one or more key presses by the user and receives from the language module (i) graphical font data representing bitmaps of the strokes represented by the one or more key presses and (ii) likely Chinese characters accurately represented by the stroke category sequence represented by the one or more key presses. The appliance can provide a user interface whereby the user selects one of the Chinese character candidates or continues to specify additional stroke categories to more particularly specify the intended character.

The language module also provides font data lookup service to the appliance. In particular, the appliance submits one of more character identifiers and receives in return font data representing a graphical representation of each such character. Providing font data lookup in as a service separate from user input interpretation allows the language module to provide graphical representations to characters other than those specified by the user. For example, the appliance can use such font data lookup to obtain appropriate characters for representing textual prompts to the user or messages received from outside sources and intended for the user.

The language module can support more than one written language and can support more than one textual input mode. The appliance can therefore provide a user interface by which the user can specify which of the supported languages and input modes are to be used.

Thus, an appliance can provide a textual interface and be made truly language-independent. To implement a specific language, a language module specific to that language is merely installed in the appliance. In addition, by providing a processing module whose primary function is language-specific processing and which implements a specific interface, such language modules can be used in various types of appliances to port a specific language from one appliance to another. The following examples are illustrative.

Consider that a Japanese speaking individual purchases both a language-independent mobile telephone and a language module which implements a preferred writing system for use with the mobile telephone. Consider further that the Japanese speaking individual subsequently purchases a newer language-independent mobile telephone and sells the previously purchased mobile telephone through an Internet-based auction to a purchaser in France. The Japanese user can simply remove the Japanese language module from the previously purchased mobile telephone and install the Japanese language module in the new mobile telephone. Similarly, the French purchaser of the first mobile telephone can convert it to a French-specific mobile telephone by merely installing a French language module.

A number of advantages are revealed in this example. First, the notion of a language-independent textual device is new. Note that the first mobile telephone was converted to Japanese language telephone by mere addition of a small plug-in module and was later converted to a French language telephone by mere replacement of the module with a French one. Thus, manufacture of a verbal interface appliance need not be designed with a specific language in mind. As a result, manufacturers of such appliances are no longer required to settle for less than a global market.

A second advantage comes from the fact that the Japanese language module in the illustrative example is portable from one appliance to another. While transporting the language module from one mobile telephone to another is described in the example, the same principle supports transporting the language module between non-analogous appliances. For example, the Japanese user could have installed the language module in a label maker rather than a new mobile telephone. Other appliances include, without limitation, Internet text appliances, electronic dictionaries, ADSI telephones, electronic address books, electronic phrase books, electronic personal organizers, television set-top boxes, and computers. Thus, a language-specific processing module can be designed, implemented, and manufactured independently of the particular verbal interface device in which the module is to be used.

The overall result is the de-coupling of verbal interface devices and language specific processing. Thus, a manufacturer of a verbal interface appliance can make one such appliance for the entire world, and a language associated with a relatively small corresponding population can be served in a cost-effective manner since a single type of processing module for that language can be made for all types of verbal interface appliances. To determine whether implementation of a language-specific device for such a population would no longer be made by examining the costs and markets for each appliance individually but instead for all verbal interface appliances in aggregation.

DETAILED DESCRIPTION

Figure 1:
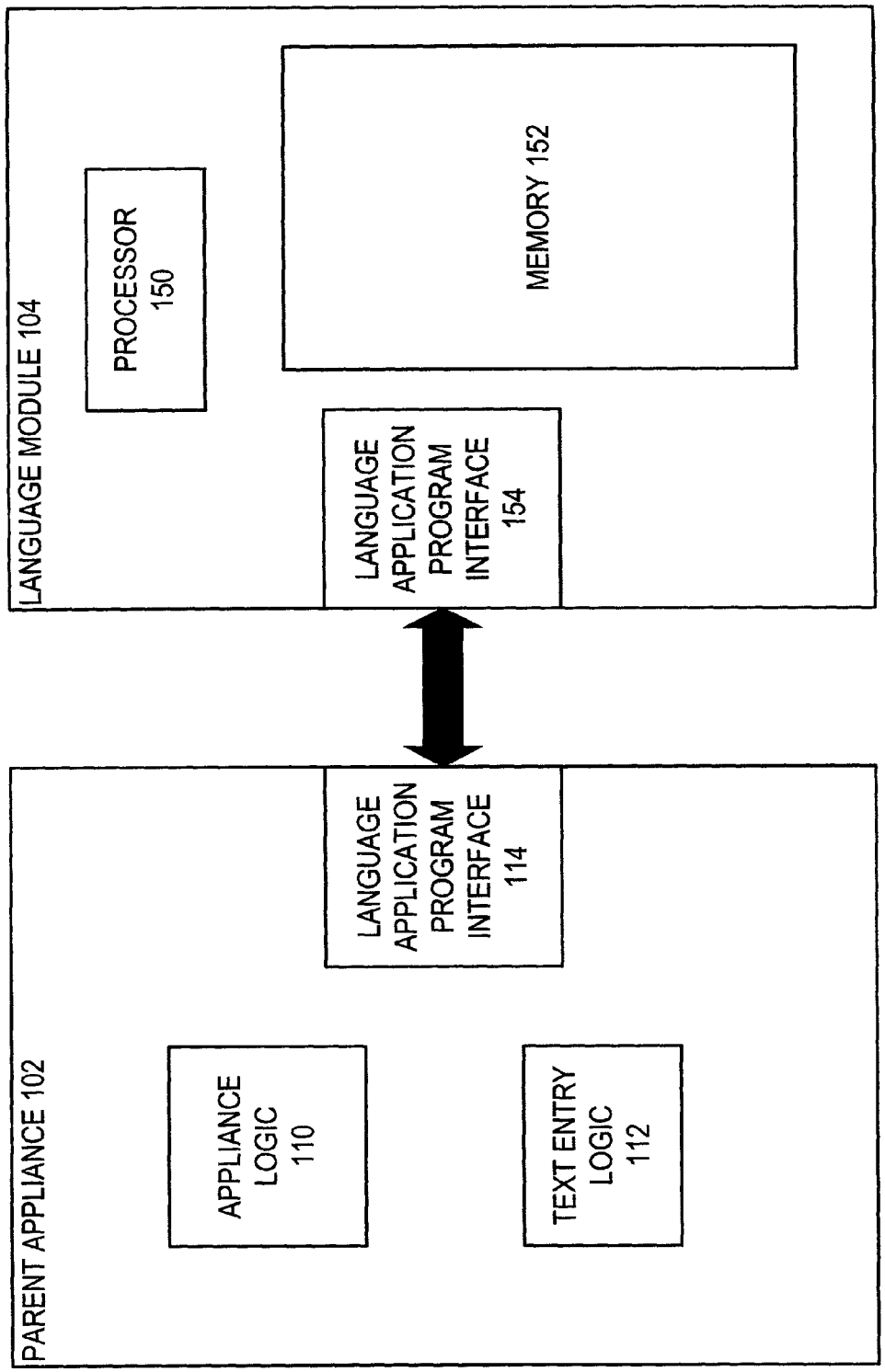
FIG. 1 is a block diagram of a parent appliance and a language module interacting through an API in accordance with the present invention.

In accordance with the present invention, language-specific tasks are performed by a language module 104 (FIG. 1) which is adjunct to a parent appliance 102. Parent appliance 102 can be any device which implements a verbal user interface such as a textual input interface for user input. In one illustrative embodiment described herein, parent appliance 102 is a mobile telephone with text messaging capability. Specifically, language module 104 performs language-specific tasks at the request of parent appliance 102 in a server-client relationship in which language module 104 is the server and parent appliance 102 is the client.

By performing language-specific processing, language module 104 saves processing resources of parent appliance 102 which would otherwise be used to implement a text interface in that particular language. Thus, any parent appliance with an existing text interface can be modified to use a particular language by interaction with a language module serving that language in accordance with the present invention. Manufacturers of such parent appliances can therefore produce all such appliances in a single production run and produce various language modules to adapt each appliance to a particular module. In addition, language modules such as language module 104 can be produced with a standard interface such that language modules for a particular language can be produced for various types of appliances. Thus, even languages used by a relatively small culture can represent a sufficiently large market for text interface appliances of all types to represent sufficient economies of scale to have language modules economically produced for their language.

Language module 104 is detachable from parent appliance 102 such that language module 104 can be used with a different appliance and such that a different language module can be used by parent appliance 102. In this illustrative embodiment, language module 104 is a Subscriber Identification Module (SIM) card which is configured to behave in the manner described herein. Thus, a user can purchase a single language module for a particular language and can insert the language module into a mobile telephone to thereby configure the mobile telephone to provide a user interface in the user's language of choice. In addition, the user can, upon selling or otherwise terminating use of the mobile telephone, remove the language module and insert it into a new mobile telephone or another appliance to interact with the new appliance in the language of choice. Such makes parent appliance 102 a truly international appliance.

Parent appliance 102 and language module 104 interact with one another though a language application program interface (API). Parent appliance 102 uses language API 114, and language module 104 uses language API 154. Language API 154 is described in greater detail below.

Parent appliance 102 includes appliance logic 110 and user interface logic 112. Appliance logic 110 defines the behavior of parent appliance 102 in performing the tasks for which it was created. For example, if parent appliance 102 is a mobile telephone, appliance logic 110 includes logic for establishing, maintaining, and terminating a wireless communications channel between parent appliance 102 and one or more base stations; for performing dialing tasks to enable establishment of voice telephone calls through the communications channel; and for conducting a voice conversation through the communications channel. User interface logic 112 implements language-independent aspects of a verbal user interface and includes references to language API 114 for language-specific aspects of the user interface. Appliance logic 110 and user interface logic 112 collectively include one or more processors and memory which stores computer instructions and data defining the behavior described here.

Language module 104 includes, in addition to language API 154, a processor 150 and memory 152 for storage of logic and data to define the behavior of language module 104 in implementing language-specific processing in the manner described herein. Thus, when cooperating with parent appliance 102, language module 104 has a separate processor 150 which executes concurrently with, and independently of, parent appliance 104.

Figure 2:
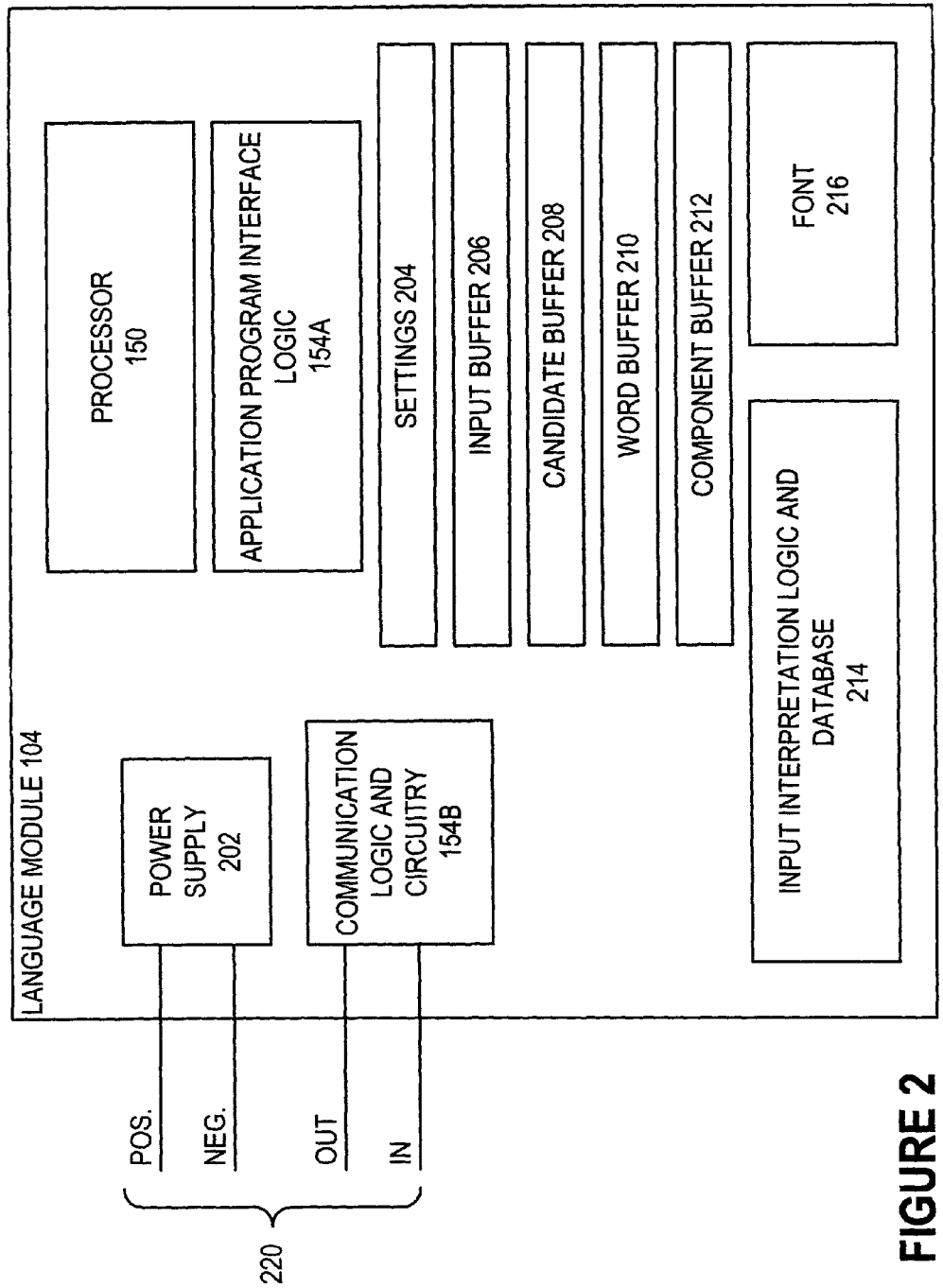
FIG. 2 is a block diagram of the language module of FIG. 1 in greater detail.

Language module 104 is shown in greater detail in FIG. 2. Language API 154 (FIG. 1) generally includes language API interface logic 154A (FIG. 2) and communication logic and circuitry 154B. Language module 104 interacts with parent appliance 102 (FIG. 1) generally through a serial port 220 in this illustrative embodiment. Serial port 220 includes positive and negative terminals for power used by power supply 202 which in turn supplies power to language module 104. Serial port 220 also includes a data in line and a data out line which are used by communication logic and circuitry 154B to exchange data with parent appliance 102 through serial port 220.

Settings 204 of language module 104 contains data representing various operational parameters of language module 104. Such parameters include a selected one of one or more languages supported by language module 104; a selected one of one or more user input modes; and respective numbers of characters and components of candidate interpretations of user input gestures. Language module 104 can implement more than one language or more than one character set, e.g., both the GB-2312 and Big5 variants of the written Chinese language in this illustrative example. Settings 204 indicate which of such languages or character sets is currently in use. Language module 104 can also support multiple user input modes including one or more stroke specification modes and one or more character specification modes. Settings 204 also indicate which of the supported input modes is currently being used within language module 104.

Input buffer 206 of language module 104 stores data representing key strokes entered by the user in specifying a message unit. A message unit can be a character, a word, or a phrase. Some verbal user interfaces have the user specify individual character, which can be whole words in some languages. Other verbal user interfaces have the user specify whole words or phrases which include multiple characters. A message unit, as used herein, is a unit of a message as specified by the user at one time. For example, if the user specifies a few characters and is then permitted to choose a phrase beginning with those few characters to thereby specify the entire phrase at once, the phrase is a message unit. Conversely, if the user specifies each character individually, the individual character is the message unit.

Candidate buffer 208 stores candidate interpretations of user input gestures as determined by language module 104 in a manner described more completely below. Each candidate is a possible interpretation of the message unit intended to be entered by the user.

Word buffer 210 stores message units recently specified by the user for word continuation analysis in interpreting subsequent user input gestures.

Component buffer 212 stores data representing components of a currently specified message unit. The currently specified message unit is the message unit which the user has begun to specify but has not yet completely specified. Components are those parts of the language implemented by language module 104 of which the current message unit is made up. Components are used to provide feedback in the subject language to the user as individual components of the current message unit is specified. The following example is illustrative. Suppose the user is specifying a Chinese character by pressing keys of a mobile telephone corresponding to classes of strokes used to write the character in the traditional manner. As the user presses keys, it would be disconcerting to see no feedback at all on the screen of the mobile telephone. It would be only slightly less disconcerting to see characters appear on the screen that are unintelligible to a person who reads only Chinese. For example, Latin letters or numbers corresponding to the pressed keys would not be helpful in the specification of a Chinese character by the user. Accordingly, language module 104 stores—in component buffer 212— data identifying symbols which can be used to represent individual components (e.g., individual classes of strokes in this illustrative example) to the user to thereby provide useful feedback. The use of components is described more completely below.

Input interpretation logic and database 214 includes logic and data by which language module 104 interprets user input gestures according to the language supported by language module 104. Font 216 stores data provided by language module 104 to parent appliance 102 (FIG. 1) to properly display characters entered by the user. Such alleviates responsibility for being able to properly represent characters of any written language from the parent appliance and rests that responsibility with language module 104.

Logic flow charts 300 (FIG. 3) and 350 illustrate cooperation between parent appliance 102 (FIG. 1) and language module 104 in creating a text message as entered by the user. Logic flow diagram 300 represents behavior of parent appliance 102, and logic flow diagram 350 represents behavior of language module 104.

In step 302 (FIG. 3), user interface logic 112 (FIG. 1) sends an initialization command through APIs 114 and 154 to language module 104. In response in step 352 (FIG. 3), API logic 154A (FIG. 2) establishes a known, default state in settings 204, input buffer 206, candidate buffer 208, word buffer 210, and component buffer 212. In this illustrative embodiment, the known default state includes a default language, a default user input mode, default buffer lengths for buffers 206-212, and cleared buffers 206-212. Upon successful completion of initialization of language module 104, API logic 154A sends an acknowledgment (ACK) signal to parent appliance 102 (FIG. 1). In one embodiment, parent appliance 102 waits for the acknowledgment before proceeding. In an alternative embodiment, parent appliance 102 proceeds without waiting to the acknowledgment such that initialization of language module 104 occurs asynchronously.

To complete initialization of language module 104, user interface logic 112 sets settings within language module 104 to the extent that such settings deviate from the default state. For example, user interface logic 112 can select a non-default language supported by language module 104 and can select a non-default user input mode and can select non-default buffer lengths to optimize performance characteristics based on the particular application of parent appliance 102.

Figure 3A:
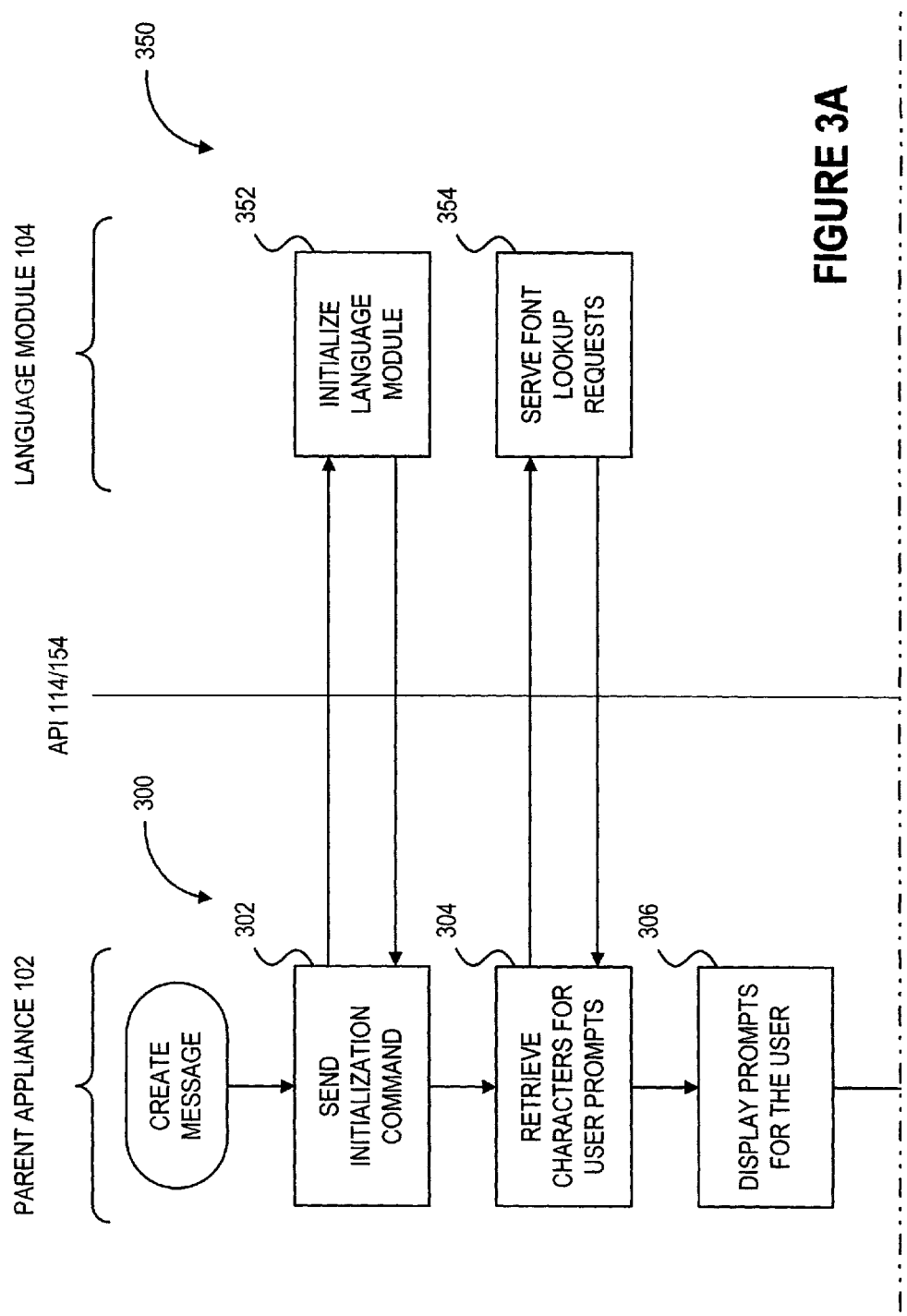
FIG. 3 is a logic flow diagram of the interaction between the parent appliance and the language module in accordance with the present invention.

In step 304 (FIG. 3), user interface logic 112 (FIG. 1) retrieves symbols of the current language to properly represent user interface prompts to the user in the selected language. In particular, user interface logic 112 requests font data from language module 104, and language module 104 serves those requests in step 354 (FIG. 3). In this illustrative embodiment, font 216 (FIG. 2) includes standard prompt data in addition to font data representing symbols of the one or more languages implemented by language module 104. Such standard prompt data can include such items as the user's pre-entered name, characters used to represent the date and time, "New Message:," "Send to:," "Message:," "Send," and "Quit." Such prompts are stored as sequences of character data, e.g., in Unicode format or alternatively in ASCII format. To properly display the retrieved prompts, parent appliance 102 retrieves font data, i.e., graphical data specifying the graphical representation of each character according to the character's numerical identifier which is a Unicode number is this illustrative embodiment. In step 354 (FIG. 3), language module 104 (FIG. 1) serves the font lookup requests to thereby provide the requested font data.

Steps 304 (FIG. 3) and 354 are shown more completely as logic flow diagrams 304 (FIG. 4) and 354, respectively. Loop step 402 and next step 412 define a loop in which parent appliance 102 (FIG. 1) processes each character of text to display to the user. During each iteration of the loop of steps 402-412 (FIG. 4), the character processed by parent appliance 102 (FIG. 1) is referred to sometimes as the subject character. In step 404, parent appliance 102 sends data representing the subject character through API 114/154 to language module 104. In response, language module 104 records the data representing the subject character in step 452 (FIG. 4) and acknowledges such recordation.

Loop step 406 and next step 410 define a loop in which parent appliance 102 processes each part of the font data according to step 408. In this illustrative embodiment, processor 150 (FIG. 2) is a 4-bit processor and therefore processes information in small pieces, e.g., one byte in a single data transaction. As a result, font data representing a graphical representation of a character to be displayed by parent appliance 102 is retrieved from language module 104 is several small pieces. In this illustrative embodiment, font data for a single character represents a 16-bit by 16-bit bitmap and language module 104 serves one byte of such font data in a single transaction. Accordingly, thirty-two (32) transactions are required to obtain font data for a single character. Each such transaction is represented by step 408 (FIG. 4) in which parent appliance 102 requests a sequential part of the font data of the character sent in step 404 and by step 454 in which language module 104 responds by sending each sequential part of the font data.

Thus, parent appliance 102 retrieves font data from language module 104 using several transactions as shown in logic flow diagrams 304 and 354. As a result, language module 104 (FIG. 1) can be produced small and consume relatively little power and, in this illustrative embodiment, language module 104 is implemented in a SIM card. In other alternative embodiments, greater speed and memory capacity can be desirable at the expense of compact size and/or power consumption. In these alternative embodiments, font data for one or more characters can be retrieved in a single transaction.

Once parent appliance 102 has retrieved font data for user prompts, user interface logic 112 of parent appliance 102 displays appropriate prompts to the user in step 306 (FIG. 3). In response to user-generated signals initiating a text entry mechanism, user interface logic 112 (FIG. 1) implements a text entry user interface in step 308 using language module 104 whose counterpart processing is represented as step 356 (FIG. 3).

Figure 5:
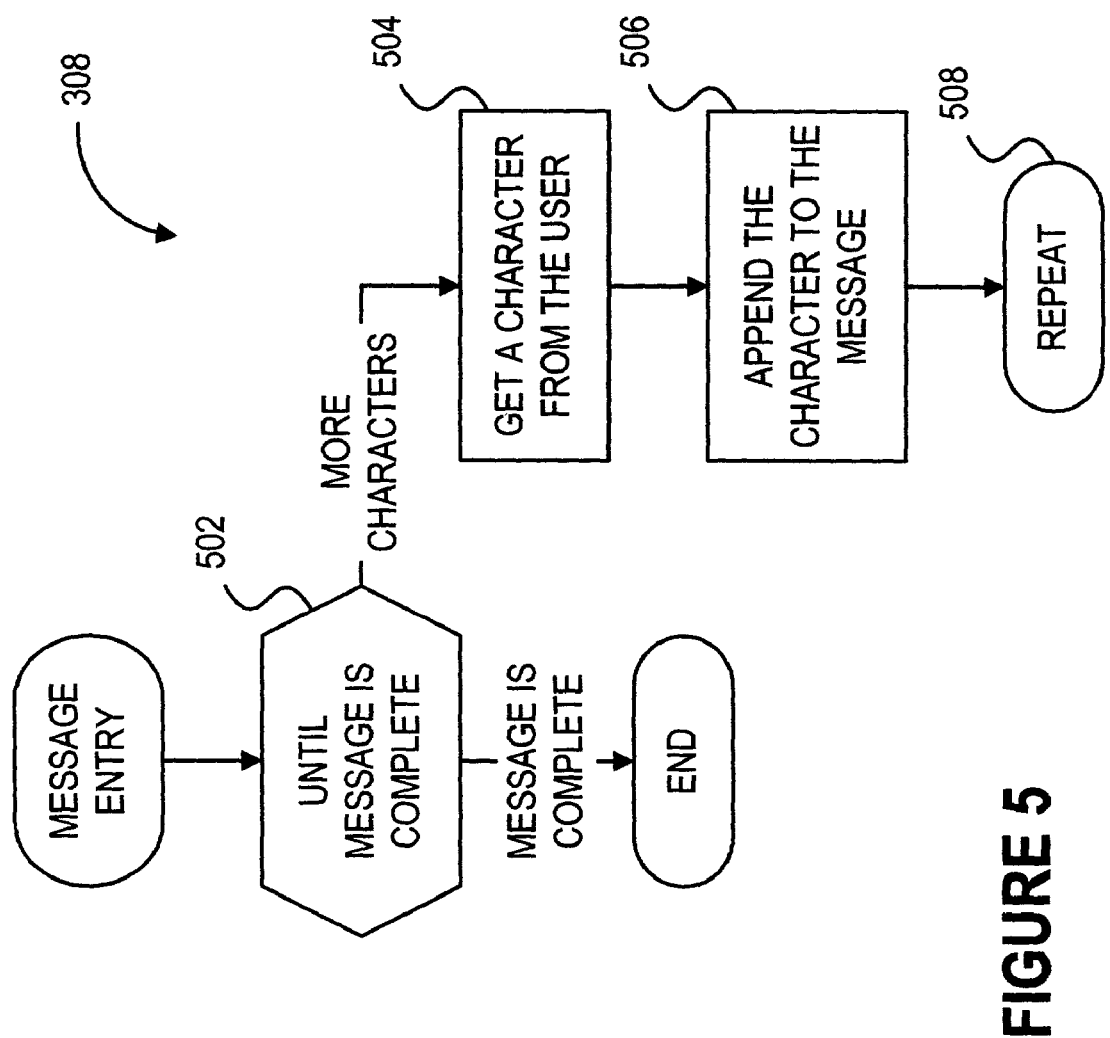
FIG. 5 is a logic flow diagram of message entry logic implemented by the parent appliance of FIG. 1.

Step 308 is shown in greater detail as logic flow diagram 308 (FIG. 5). Loop step 502 and repeat step 508 define a loop in which the user enters each message unit of a subject message. Until the subject message is complete, processing by user interface logic 112 (FIG. 1) transfers from loop step 502 (FIG. 5) to step 504.

Figure 6:
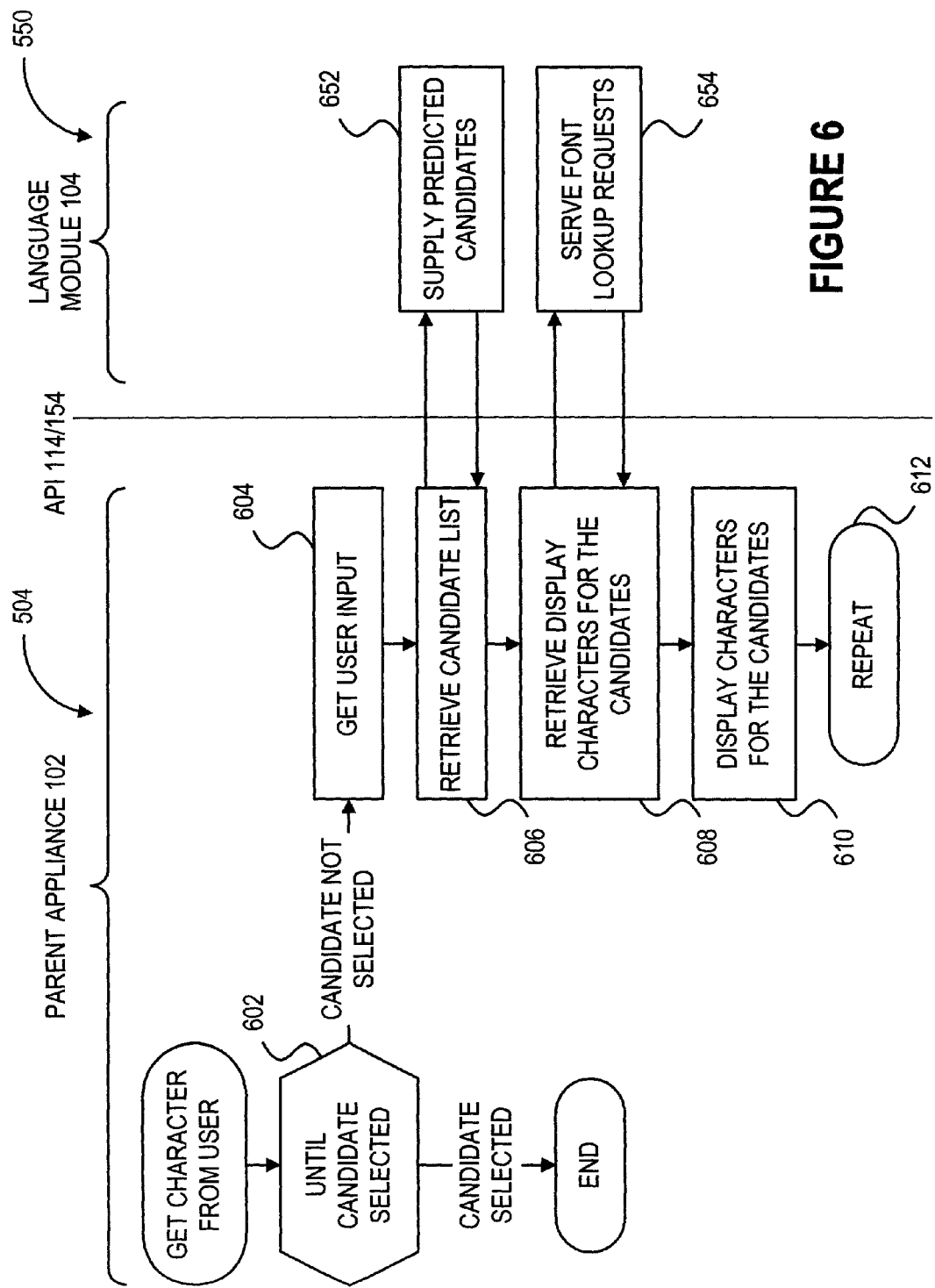
FIG. 6 is a logic flow diagram of user input interpretation between the parent appliance and the logic module in accordance with the present invention.

In step 504, user interface logic 112 (FIG. 1) determines a message unit of the subject message as specified by the user using user interface techniques including physical manipulation of one or more user input devices. Step 504 is shown in greater detail as logic flow diagram 504 (FIG. 6).

Loop step 602 and repeat step 612 define a loop in which user interface logic 112 of parent appliance 102 detects user input gestures until the user has completely specified a unit of text, e.g., a character or word. In step 604, user interface logic 112 detects a user input gesture such as pressing of a key on a keypad of parent appliance 102. In step 606, user interface logic 112 sends data representing the user input gesture to language module 104 and retrieves from language module 104 a list of one or more candidates for the unit of text intended by the user. Production of the one or more candidates by language module 104 is represented by step 652 of logic flow diagram 356 which in turn represents step 356 (FIG. 3) in greater detail.

Steps 606 and 652 are shown in greater detail as logic flow diagrams 606 (FIG. 7) and 652. In step 702, user interface logic 112 (FIG. 1) sends data representing the user input gesture to language module 104. In this illustrative embodiment, the user input gesture is the pressing of a key on the keypad of parent appliance 102 which is a mobile telephone in this illustrative example. The data representing the user input gesture is a numerical identifier of the particular key pressed.

Figure 7:
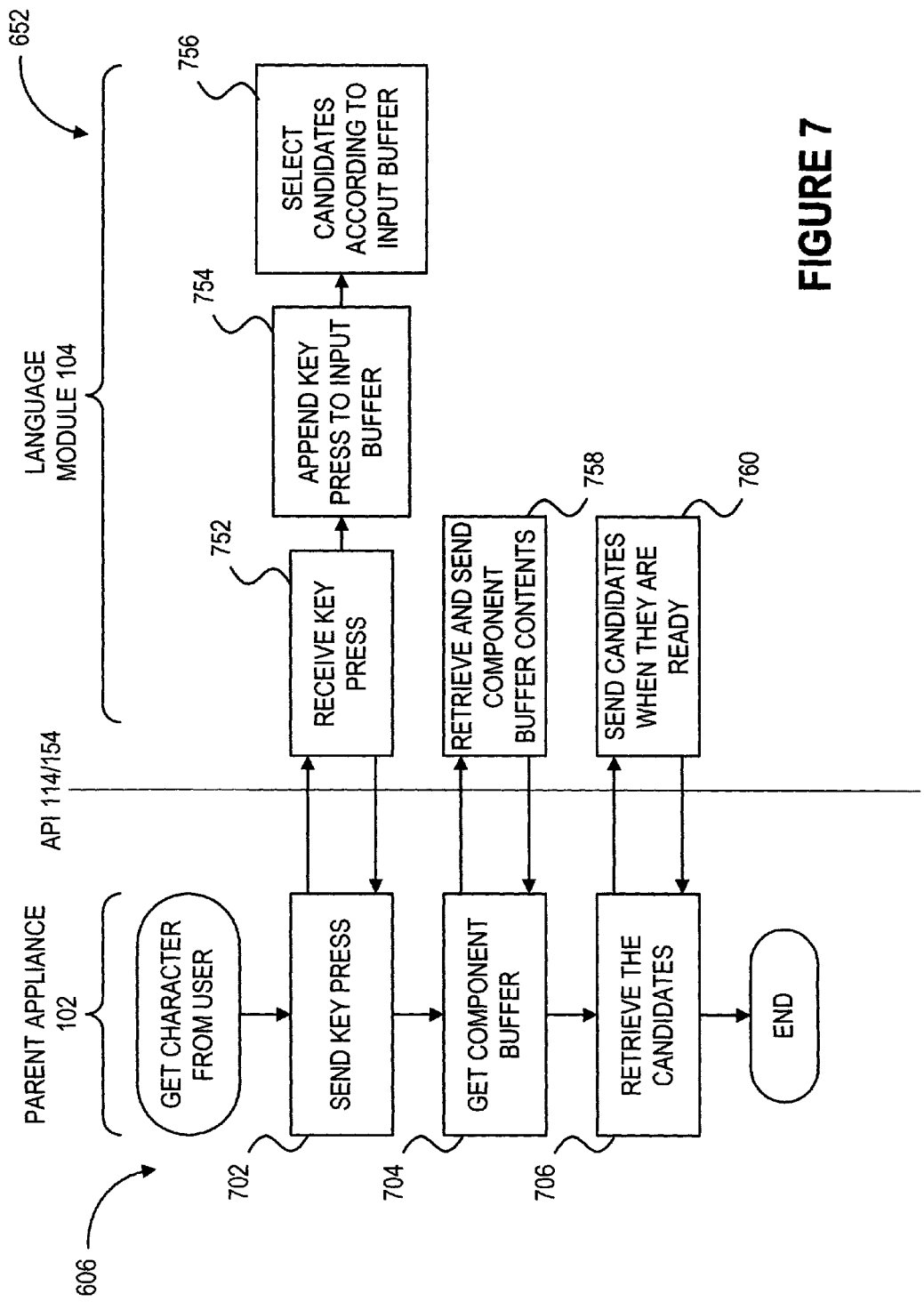
FIG. 7 is a logic flow diagram of a portion of the user input interaction of FIG. 5 in greater detail.

In step 752 (FIG. 7), language module 104 (FIG. 1) receives the data representing the user input gesture through API 114/154. Language module 104 appends the user input gesture to input buffer 206 (FIG. 2) in step 754 (FIG. 7). In step 756, language module 104 (FIG. 2) selects candidates for the unit of text intended by the user according to the one or more user input gestures stored in input buffer 204. The manner in which language module 104 selects candidates according to the contents of input buffer 204 depends on the particular language or languages implemented by language module 104.

For example, if language module 104 implements text input in the written Chinese language, language module 104 can select candidates in the manner described in U.S. Pat. No. 5,109,352 to Robert B. O'Dell and that description is incorporated herein in its entirety by reference. Briefly, a category of writing strokes can be assigned to each respective key of the keypad of parent appliance 102 and language module 104 can interpret the represented stroke categories in the manner described in the incorporated text of U.S. Pat. No. 5,109,352.

Similarly, if language module 104 implements text input in the written Japanese language, language module 104 can select candidates in the manner described in U.S. patent application Ser. No. 09/888,222 by Samuel Yin Lun Pun et al. entitled "Japanese Language Entry Mechanism for Small Keypads" and filed Jun. 22, 2001 and that description is incorporated herein in its entirety by reference. Analogously, other languages can be implemented using various other mechanisms for selecting predictive candidates for text units such as characters or words. In fact, the particular mechanism used by language module 104 is not particularly important. Moreover, a significant advantage is that various language user interfaces can be implemented in competing embodiments of language module 104 and such competing embodiments can be interchangeable in a given parent appliance. Consumers would therefore be free to select a particular brand of appliance for its substantive features and to match that appliance with a particular, favored implementation of a preferred language interface of the user. In addition, consumers can take their favored implementation of their preferred language in the form of language module 104 out of one appliance and install it in another appliance thereby porting the familiarity and comfort of the user interface from one appliance to another. Furthermore, an appliance used in one language market (e.g., the Japanese language market) can be rendered internationally useable by removal of language module 104. A purchaser of the appliance in a different language market (e.g., the United States) can readily use the appliance by merely inserting a new language module for a language with which the user is familiar.

In this illustrative embodiment, language module 104 immediately acknowledges receipt of the user input gesture in step 752 and performs steps 754-756 asynchronously. Parent appliance 102 retrieves the contents of component buffer 212 in step 704, and language module 104 responds by sending the contents of component buffer 212 in step 758. Such enables representation of the user input gestures by parent appliance 102 as feedback to the user in the language implemented by language module 104 and selected as indicated in settings 204.

In step 706 (FIG. 7), user input logic 112 (FIG. 1) of parent appliance 102 retrieves the candidates selected by language module 104. Language module 104 sends the candidates when the candidates have been selected by input interpretation logic and database 214 and stored in candidate buffer 208. The resulting candidates generally include one or more message units which match the one or more user input gestures represented in input buffer 204 sorted in order of frequency of use of each candidate in general. The order of the candidates can also be influenced by the frequency and/or recency of use of each candidate by the user. Since language module 104 is transportable and interchangeable, language module 104 can be more personal to the particular user of language module 104. Over time, language module 104 can adapt and learn the frequently used words, slang terms, proper nouns, etc. of the owner user of language module 104, and such adaptation and learning can be transferred from parent appliance 102 to any other appliance in which language module 104 is installed.

Figure 4:
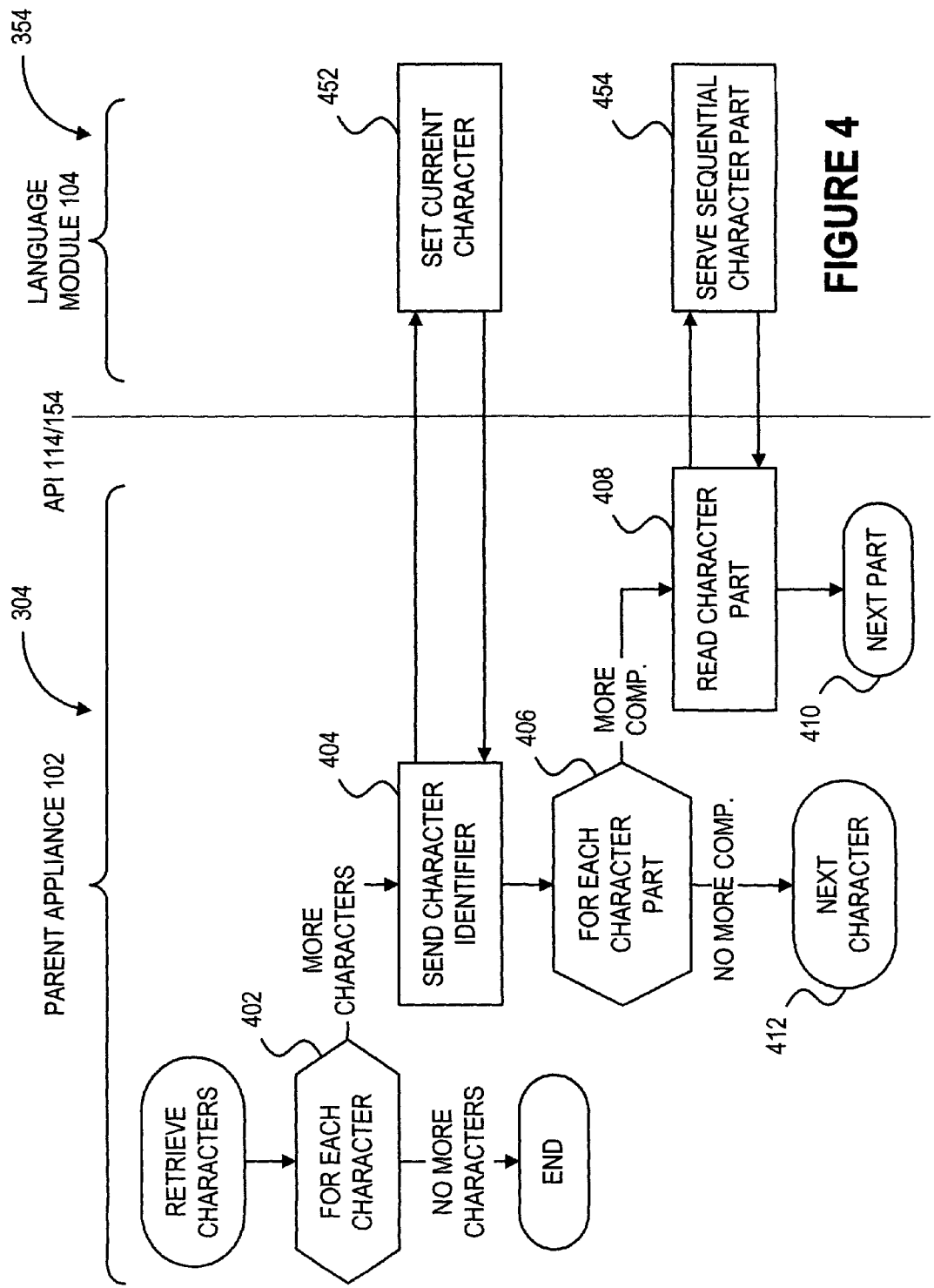
FIG. 4 is a logic flow diagram of character retrieval between the parent appliance and the language module of FIG. 3 in greater detail.

Once user interface module 112 of parent appliance 102 has received the candidate message units, processing according to logic flow diagram 606, and therefore step 606 (FIG. 6), completes. In step 608, user interface logic 112 (FIG. 1) of parent appliance 102 retrieves font data representing the candidates from which the user can select an intended language unit in the manner described above with respect to logic flow diagram 304 (FIG. 4). In response, language module 104 serves the requests for font data in the manner described above with respect to logic flow diagram 354 (FIG. 4). In step 610 (FIG. 6), user input logic 112 of parent appliance 102 displays—to the user—any prompts, the components retrieved in step 704 (FIG. 7), and the candidates retrieved in step 706 using the retrieved font data of such prompts, components, and characters, thereby providing the user with feedback and an opportunity to select one of the candidates or to further specify the intended message unit with addition user input gestures. If the user selects a candidate as the intended message unit, processing according to the loop of steps 602-612 terminates. Conversely, if the user does not select a candidate, user interface logic 112 performs another iteration of the loop of steps 602-612.

Each message unit, e.g., word or character, is sent to language module 104 by user interface logic 112 and is appended to word buffer 210 by language module 104. Contents of word buffer 210 is used by input interpretation logic and database 214 to better select language unit candidates according to the context of recently entered language units. For example, the Chinese written language mostly uses single-character words but frequently also uses multi-character words. Thus, the context of one or more recently entered characters can be used to determine if the user could be specifying a multi-character word to thereby more accurately select candidates likely to be intended by the user.

In this illustrative embodiment, language module 104 supports two different context modes. In the first context mode, input interpretation logic and database 214 uses a dictionary of ordinary words to select candidates of intended language units. In the second context mode, input interpretation logic and database 214 uses a list of proper nouns to select candidates of intended language units. User interface logic 112 can present the user with the ability to switch between ordinary language and proper nouns to better interpret user input gestures.

Thus, language module 104 performs primarily two (2) functions on behalf of parent appliance 102. First, language module 104 serves font data lookup requests to properly represent symbols in the language implemented by language module 104. Closely related to this function is providing user prompts in the same language such that parent appliance 102 can request input from the user in a language the user understands. Second, language module 104 interprets the intended meaning of user input gestures according to the language implemented by language module 104. For example, pressing the "2" key of a numeric keypad on a mobile telephone can represent (i) any of the letters "a," "b," or "c" in a language using the Latin alphabet, e.g., English; (ii) any Hiragana corresponding to the second consonant group of the fifty-sounds table of the Japanese language; or (iii) a category of strokes used to draw a character in the Chinese language. The proper interpretation of this pressing of the "2" key depends upon the particular language implemented by language module 104, and that interpretation can be changed by simply replacing language module 104 with a different language module which implements a different language.

API

To facilitate appreciation and understanding of the present invention, the API implemented by API logic 154B is described in greater detail. The following illustrative example of an API implements both GB-2312 and Big5 standard character sets of the Chinese written language. In addition, language module 104 implements three user input modes in this illustrative embodiment.

In the first input mode known as "Zi 8 Input," each key of a keypad represents a class of strokes by which one would render a Chinese character. The user enters the first written stroke by pressing a key corresponding to the class to which the stroke belongs and is shown a selection of candidate characters based on the occurrence frequency of characters beginning with that stroke in everyday language usage. If the user sees the intended character, the user can immediately select the intended character. Otherwise, the user enters the next stroke one would use to render the intended character and another group of candidate characters are presented to the user. Subsequent strokes can be entered to further limit the list of candidate characters until the intended character is listed among the candidates.

From the point of view of language module 104, it receives data that represents the next in a series of inputs from parent appliance 102. In response to any user input data and in the manner described above, language module 104 generates a list of addresses of characters and sends the list in response to the GetChar(n) or GetComp(n) instruction invoked by parent appliance 102. The examples above and below illustrate this process.

When a user selects a candidate character, language module 104 can be optionally informed of the previously chosen candidate characters so that when the user picks the first stroke of the next character, the module now delivers candidates which are closely linked to the previous character(s) to form words or names (according to a context mode described above and below). Subsequently, when there are no more valid linkages according to contextual relations between characters (such as multi-character words including the previously entered characters), language module 104 delivers unlinked candidate characters (i.e., characters unrelated to previously entered characters by context) in order of usage frequency.

In the second input mode known as "Han Yu Pinyin," the user enters the first letter of a character using the Latin alphabet. Language module 104 receives this data from parent appliance 102 either unambiguously or categorically as a group of two or more Latin letters and returns a number of candidate characters in the Chinese language. These candidates are displayed to the user by parent appliance 102 and the user either selects a character or enters the subsequent letter of the intended Chinese character's phonetic spelling. When the intended Chinese character is finally selected, the process can be repeated for subsequent Chinese characters of the intended message. The invocation of word association, whether by word or name list, is processed as previously described.

In the third input mode known as "BoPoMoFo," the user enters text in the manner described above with respect to Han Yu Pinyin except that the Chinese National alphabet is used rather than the Latin alphabet to phonetically spell out intended Chinese characters. This particular mode is remarkably useful in Taiwanese society where this method is widely used. The letter set font is included as part of font 214 which also contains the ideographs for the components.

As described above, language module 104 is self-contained and modular using only a 4-wire serial connection to parent appliance 102. Serial connection 220 is unipolar using signaling analogous to that of RS-422 signaling and supports most current standard serial-port communication rates.

Language module 104 includes a good quality 16×16 bit-mapped font 214 which covers the Unicode addresses from 4E00 to 9FA5. Using the GetFont instruction described below, followed by the two-byte address of the characters, causes language module 104 to send a bit stream of 32 bytes which define the graphical representation of the desired character. Thus, in a device which has received a Unicode based message in the Chinese address range, the device can simply pass this data to language module 104 to receive a rendering of the message in the font implemented by language module 104.

Language module 104 implements the following brief set of functions as the API as shown in Table A. When the function is invoked, the response of language module 104 is as noted below. This illustrative embodiment of language module 104 is designed to minimize the demands on parent appliance 102 and to facilitate location and display of Chinese characters for any device which can display graphic information. The command byte is shown in the left column. Only seven of the commands are longer than one byte.

TABLE A

| Command | Name | Result |
| --- | --- | --- |
| 0x FF | Reset( ) | Initializes language module 104 to the default condition. Candidate buffer 208 and component buffer 212 are populated by the zero input assumptions. Starting values for module variables are described below. |
| 0x FC | SetLangGB( ) | Causes language module 104 to operate in the simplified GB-2312 character set and produce only data related to this language form. |
| 0x FD | SetLangBig5( ) | Causes language module 104 to operate in the traditional Big 5 character set and produce only data related to this language form. |
| 0x FE | SetLangAll( ) | Causes language module 104 to operate in the full composite character set and produce data by likelihood of occurrence, unsorted by set membership. The output is mixed and is normally used when an operator is unsure of the set needed. |
| 0x FB | SetName( ) | Language module 104 seeks associated character relationships based on a list of Names within input interpretation logic and database 214 as opposed to a list of Words. |
| 0x FA | SetWord( ) | Language module 104 seeks associated character relationships based on a list of Words within input interpretation logic and database 214 as opposed to a list of Names. |
| 0x 50 - 6F | SetCharNum(n) | Causes language module 104 to set the number of character addresses (byte pairs) that language module 104 will seek as candidates in response to keyboard input. The maximum value is 32 addresses (64 bytes). |
| 0x 70 - 8F | SetCompNum(n) | Causes language module 104 to set the number of component addresses (byte pairs) that language module 104 will seek as candidates in response to keyboard input. The maximum value is 32 addresses (64 bytes). |
| 0x 00 - 0A[1] | StrokeMode(n) | Tells language module 104 to enter the stroke corresponding to the value n as the next stroke in input buffer 206. (See Note 1 below.) |
| 0x 10 - 2F[1] | PinYinMode(n) | Tells language module 104 to enter the Latin letter corresponding to the value n as the next stroke in input buffer 206. (See Note 1 below.) |
| 0x 30 - 4B[1] | ZhuYinMode(n) | Tells language module 104 to enter the Chinese National Alphabet Letter corresponding to the value n as the next stroke in input buffer 206. (See Note 1 below.) |

TABLE A-continued

| Command | Name | Result |
|---|---|---|
| 0x F3 | ReadInputBuffer( ) | Causes language module 104 to send the contents of input buffer 206; input buffer 206 remains unchanged. Stored candidates for characters and components are unchanged by this command. |
| 0x EF | ReadWordBuffer( ) | Causes language module 104 to send the contents of word buffer 210; word buffer 210 remains unchanged. Stored candidates for characters and components are unchanged by this command. |
| 0x EE | ReadCompBuffer( ) | Causes language module 104 to send the contents of component buffer 212; component buffer 212 remains unchanged. Stored candidates for characters and components are unchanged by this command. |
| 0x F0 | ClearInputBuffer( ) | Causes language module 104 to clear input buffer 206; language module 104 awaits input. Stored candidates for characters and components are re-populated to initial values. |
| 0x F1 | ClearLastInput( ) | Causes language module 104 to reset the last value sent to input buffer 206 to zero. Language module 104 re-populates stored candidates and components of candidate buffer 208 and component buffer 212, respectively, to their respective previous states. |
| 0x F2 | ClearWordBuffer( ) | Causes language module 104 to clear word buffer 210. |
| 0x ED | ClearCompBuffer( ) | Causes language module 104 to clear component buffer 212. |
| 0x A0 - AF | GetChar(n) | Causes language module 104 to transmit the next n character addresses from candidate buffer 208. If fewer than n addresses are available, language module 104 fills the remaining byte pairs with 0x0000. |
| 0x B0 - BF | GetComp(n) | Causes language module 104 to transmit the next n component addresses from component buffer 212. If fewer than n addresses are available, language module 104 fills the remaining byte pairs with 0x0000. |
| 0x 90 - 93 (+n) | SetCompBuff(n) | Causes language module 104 to store the data which follows the command in component buffer 212. This command is followed by up to 4 byte pairs which are the values of the component(s) which are contained in the characters sought. Language module 104 uses these component(s) as the leading part(s) of a character search. Language module 104 produces a character candidate list in candidate buffer 208 based on characters beginning with these components. |
| 0x 9C - 9D (+n) | Set WordBuff(n) | Causes language module 104 to store the data which follows the command in word buffer 210. This command is followed by up to 4 byte pairs being the Unicode addresses of the character(s) which start a word. Language module 104 uses these character(s) as the leading character(s) of a word matching search. Language module 104 produces a character candidate list which is biased in favor of words beginning with these leading characters. |
| 0x 4F (+2) | GetFont(addr) | Requests a font data lookup by language module 104. The two bytes which follow this command byte are the Unicode address of the character or an alternative address for non-Unicode characters. Language module 104 returns a stream of 32 bytes representing the bitmap of the character graphic in a 16 × 16 format. Starting at the top left hand corner, the first two bytes are the first line and so on. The $n^{th}$ byte pair represents the $n^{th}$ line of the graphic. |
| 0x 4E (+2)[2] | GetComp(addr) | Requests a font data lookup by language module 104 for a component. Two bytes which identify the component desired follow this command. The module then returns a stream of bytes representing the bitmap of the component graphic. Starting at the top left hand corner, the first two bytes are the first line and so on with the $n^{th}$ byte pair representing the $n^{th}$ line of the graphic. Because the component graphics are generally smaller than the full characters, the last unused bits of every second byte are zero valued to pad the stream as complete byte pairs. (See Note 2 below.) |
| 0x ED (+2) | GetStroke(addr) | Requests stroke order for a particular character from language module 104. When the two byte address of the selected character is passed to language module 104 in this instruction, language module 104 returns a string which represents the stroke order for typing a character completely. Each returned byte represents a single stroke. |

TABLE A-continued

| Command | Name | Result |
|---|---|---|
| 0x EC (+2) | GetPinYin(addr) | Requests the Han Yu PinYin phonetic spelling of a particular character from language module 104. When the two byte address of the selected character is passed to language module 104 in this instruction, language module 104 returns a string which represents the phonetic spelling of the character in the HanYu PinYin, and the letter order for typing a character completely in the PinYin mode. Each byte is one letter. |
| 0x EB (+2) | GetZhuYin(addr) | Requests the BoPoMoFo phonetic spelling of a particular character from language module 104. When the two byte address of the selected character is passed to language module 104 in this instruction, language module 104 returns a string which represents the phonetic spelling of the character in the BoPoMoFo form, and the letter order for typing a character completely in the ZhuYin mode. Each byte is one letter. |

Note 1 for the above API: it is not permitted to enter user input data in one input mode when another input mode is active. For example, parent appliance 102 cannot submit user input data representing a stroke using StrokeMode (n) when PinYin mode is active. Doing so produces an error code BadRequest. Input buffer 206 (FIG. 2) must be cleared when switching modes.

Note 2 for the above API: while characters represent the Chinese characters ultimately specified by the user, components are elements other than such characters to be shown to the user. For example, in the PinYin mode, the user is shown Latin letters entered so far in phonetically spelling out an intended Chinese characters. Accordingly, those Latin letters are components and are stored within font 216 separately from the Unicode character set. Similarly, strokes and the Chinese National alphabet are represented within font 216 as components.

Language module 104 produces error codes in certain circumstances so that the designer of user interface logic 112 (FIG. 1) of parent appliance 102 can more easily detect and recover from error conditions. These error codes are few in number and should be tested for when parent appliance 102 accesses language module 104. In all but one case, language module 104 simply ignores improper data or truncates improper data to an acceptable size. In the event that fewer bytes of data than expected are received, language module 104 operates on the complete bytes received and discards partially transmitted data. The error code is always transmitted last and so, if only a single byte is received, it is important to identify this error and handle the problem.

The following Table B summarizes error codes produced by language module 104.

TABLE B

| Error Code | Name | Meaning |
|---|---|---|
| 0x 47 | BadInputValue | Language module 104 has detected a key input code which is invalid in this context. For example, a BoPoMoFo letter code was received when PinYin was set as the mode. |
| 0x 46 | BadRequest | Language module 104 has received an instruction which conflicts with the present mode. This may occur if a mode change is requested part way through an input sequence. Mode change instructions must be preceded by the ClearInputBuffer( ) instruction before language module 104 will accept the command. |
| 0x 45 | BadString | This is a general error message indicating that language module 104 has received a string which is either the wrong length or else points to a phantom character. This may be either outside the local address for the letter and stroke graphics or beyond the supported Unicode group, e.g., not Chinese. |
| 0x 44 | FatalError | Language module 104 has autonomously reset to its default values as the result of an unknown error condition. |

The following Table C shows test commands supported by language module 104 to facilitate proper design and implementation of user interface logic 112.

TABLE C

| Test Code | Name | Meaning |
|---|---|---|
| 0x F9 | Welcome( ) | Language module 104 outputs the addresses for the greeting in both traditional and simplified form. |
| 0x F8 | CharTest( ) | Language module 104 generates the graphic bit streams for the following five character addresses. Each bit stream is terminated by a one second delay so that the operation of the module can be easily checked in the design phase. 0x pppp (name), 0x qqqq (name), 0x rrrr (name), 0x ssss (name), 0x tttt (name) |
| 0x F7 | VersionNo( ) | Language module 104 returns a single byte which is the version number of the module contents. The upper nibble is the major revision number and the lower nibble is the minor version number. |
| 0x F6 | WordRef( ) | Language module 104 returns a single byte code which describes the word association details. |
| 0x F5 | NameRef( ) | Language module 104 returns a single byte code which describes the name association details. |
| 0x F4 | TypeAll( ) | Language module 104 sends the graphic bit stream of each character in turn spaced by about 20 milliseconds. This simply allows an original equipment manufacturer to ensure that the character ROM is properly populated. |

Language module 104 is generally easy to use but a designer of user interface logic 112 should be aware that, when operating with a language based product, some errors in logic may still result in display of text but such text can be meaningless or inappropriate to a person fluent in the language implemented by language module 104. Thus, mere appearance of text which may look about right for a designer not fluent in the language implemented by language module 104 is insufficient to ensure proper design of user interface logic 112 and use of language module 104. It is important to handle any error reports properly even though language module 104 attempts to provide text candidates. For example, it is possible to request a number of character addresses which exceeds the number remaining. In this case, language module 104 responds with the stored values and terminates the string with as many 0x 0000 pairs as needed to conclude the request followed by the transmission of the Error Code, BadString. This alerts the designer to the fact that although the data in the string is correct, extra null bytes were added to make up the string. It does not mean that there is an error in the data returned. This allows the designer to easily strip out the valid data and discard the null entries without having to resubmit the request from within user interface logic 112.

When power is applied to language module 104, a power-up reset circuit within language module 104 generates a master reset event that brings language module 104 to life in the following configuration represented in Table D.

TABLE D

| Language Module 104 Parameter | State |
|---|---|
| Language | GB |
| Word Mode | Set to word list |
| Character Number | Set to n = 32 |
| Component Number | Set to n = 32 |
| Input Buffer | Clear |
| Input Method | Stroke Mode |
| Word Buffer | Clear |
| Content of Character List | First 32 most common characters |
| Content of Components List | First 32 most common components |

Immediately upon initialization, language module 104 is in an idle state and awaits input instructions.

The following logic flow descriptions illustrate use of the above-described API.

In this logic flow, parent appliance 102 has received a message in Unicode form, e.g., from an external source such as an SMS (Short Message Service) message. To display the message to the user, parent appliance 102 uses the GetFont( ) instruction to retrieve font data to represent each character graphically. Parent appliance 102 stores the received message and extracts each byte pair of the message in sequence. Parent appliance 102 sends each byte pair appended to the GetFont( ) instruction as the lead and trailing bytes—$U_L$ and $U_T$, respectively.

GetFont($U_L,U_T$)

Parent appliance 102 awaits response by language module 104 and eventually receives 32 bytes representing the graphical representation of the character. Parent appliance 102 subsequently sends the next character to language module using another GetFont( ) instruction and receives font data representing that character. The GetFont( ) instruction is repeated for each character of the received message and parent appliance 102 ultimately retrieves font data sufficient to render the entire received message graphically.

Figure 8:
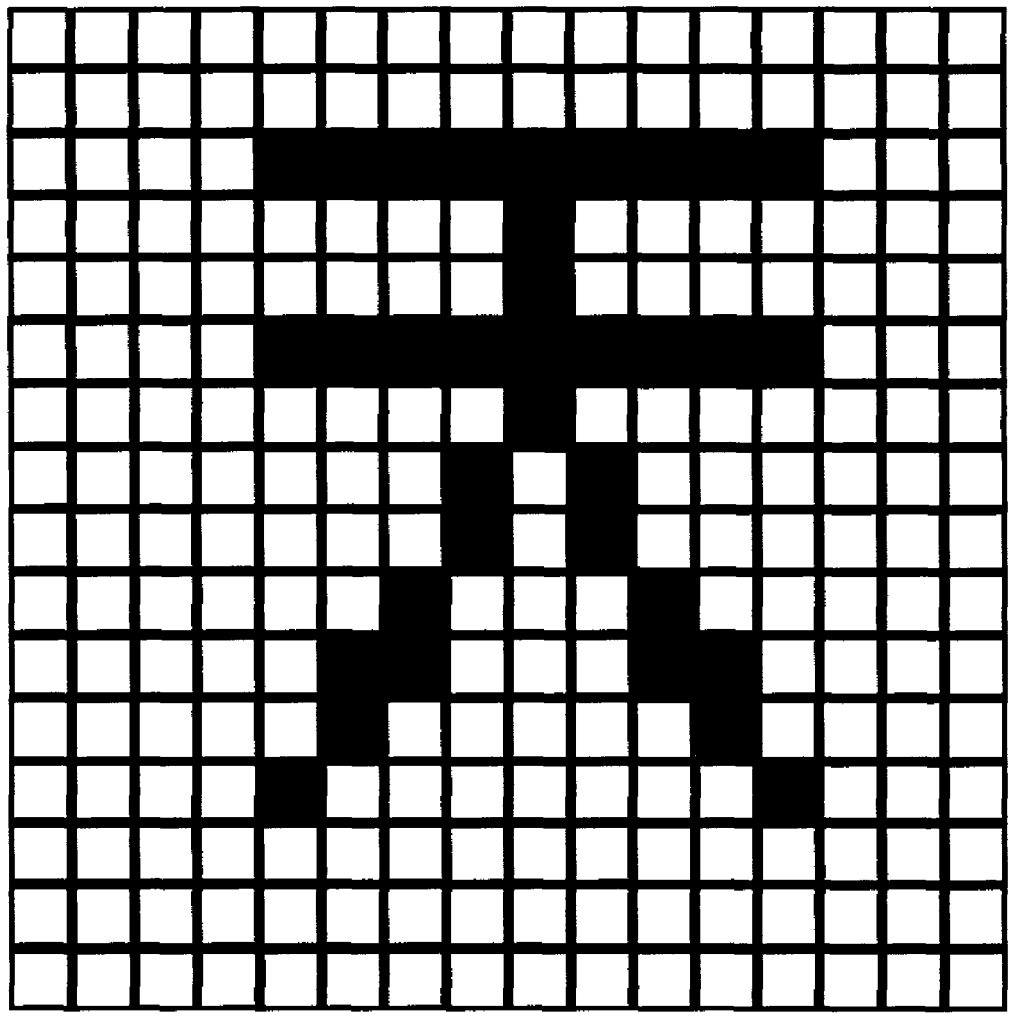
FIG. 8 is a bitmap of a Chinese character within the language module of FIG. 1 as an illustrative example.

FIG. 8 shows the Chinese character Tien—Heaven. Starting with the top row, the first two bytes are 0x 00 and 0x 00 (a row of all background color pixels). This is repeated in the second row. The third pair of bytes are 0x 0F (00001111) and 0x F8 (11111000); four background color pixels (binary zeroes) followed by nine foreground color pixels (binary ones) followed by three background color pixels (binary zeroes).

Thus, the whole font data stream for this example would be (in hexadecimal format) the following string of bytes: 00, 00, 00, 00, 0F, F8, 00, 80, 00, 80, 0F, F8, 00, 80, 01, 40, 01, 40, 02, 20, 06, 30, 04, 10, 08, 08, 00, 00, 00, 00, 00, 00. This allows the designer of user interface logic 112 of parent appliance 102 to take the stream and configure it for display in a simple bit mapped application.

If the requested data of GetFont( ) is outside the address range serviced, language module 104 returns only a single byte (0x 45) as an error code. It is the responsibility of the designer to monitor this condition and cause parent appliance 102 to respond appropriately.

The following logic flow describes creation of a Chinese text entry using parent appliance 102 in conjunction with language module 104. Parent appliance 102 displays a choice of operations to the user; "Read Message" (the task referred to above), "Create Message" and "Edit Message."

In creation mode, the keypad of parent appliance 102 is used to enter strokes or phonetic elements which are passed individually to language module 104 in the following way.

Parent appliance 102 initializes language module 104 by sending 0x FF to reset language module 104. Language module 104 is therefore in the GB language mode, set to operate in Stroke Mode with word association and with the character and component numbers set to 32. Language module 104 also populates component and character buffers with the appropriate default values at this time. All input buffers are cleared. Language module 104 is now set to the required startup values parent appliance 102. The user may be presented with a soft choice of language set in which case 0x Fr (SetLangxxx) is sent corresponding to the user's selection. The codes are sent to set the operating sizes of the character and component buffers. These buffers are now re-populated by language module 104 to correspond to the new depths. This re-population is an automatic consequence of either of the SetCharNumber( ) or SetCompNumber( ) commands.

The first action of parent appliance 102 should generally be to get the characters or components that it normally uses for its display. Parent appliance 102 issues the GetChar(n) instruction and stores the returned character byte pairs, followed by issuing the GetComp(n) instruction and storing the returned component byte pairs. It will usually be necessary to request image data from language module 104 using the GetFont(addr) command and the GetComp(addr) command. This allows parent appliance 102 to be set up to properly interact with the user.

Language module 104 is now prepared to receive user input. The input values are mapped as displayed to the user in parent appliance 102. Assume that the stroke {/} is to be sent. The user pushes the key marked {/} which is read by parent appliance 102 and re-coded as 0x 0n (StrokeMode(n); n=0–A). Language module 104 generates candidates for both characters and components and stores them internally. Parent appliance 102 sends 0x F3 (ReadInputBuffer( )) asynchronously and receives from language module 104 the contents of the entered data buffer as single byte; if three strokes have been entered, three bytes are received. Parent appliance 102 stores these three pairs. Parent appliance 102 sends 0x An (GetChar(n); n=0–F) asynchronously and then waits. When language module 104 has accumulated the candidates, it transmits n byte pairs to the parent platform where they are stored. Parent appliance 102 can now request component candidates by sending 0x Bn (GetComp(n); n=0–F) whereupon language module 104 transmits the first n byte pairs which represent components for storage by parent appliance 102.

Parent appliance 102 must now display the candidates for selection. This is done by requesting font data as described in the first example above. If valid addresses are supplied with the GetStroke(addr), GetFont(addr) or GetComp(addr) commands, language module 104 returns a string which is written to display memory by parent appliance 102. This process is repeated until the display contains the stroke input history, the candidate characters and the candidate component symbols. The user selects (by moving a cursor for example or pressing a related key) the desired character or component and the selected element is entered into the appropriate window for display. The data corresponding to this is then sent to language module 104 in one of two commands; SetWordBuff(n)

followed by n byte pairs or SetCompBuff(n) followed by up to four bytes (maximum number of components) which describe the components chosen.

When inputs are being generated, the ClearLastInput( ) command simplifies the task of editing however, it is left to the programmer of parent appliance 102 to ensure that the word and/or component buffers are properly initialized at each step of the process. In the case of the component function, there are so few components in the input buffer that it is easier to clear the buffer and send values anew (a maximum of six bytes of data which are stored in parent appliance 102—the fourth component is still to be selected). When working with words, by clearing and then re-sending a user selection, the editing task becomes much more convenient for the user of the device since at editorial time, removing a character at random from the text means that there is no working linkage available to assist the user. Thus, a user must be able to remove a character, highlight a group of characters (a text block) and have them loaded as word buffer contents prior to selecting a new character to complete the new word.

The following logic flow describes creation of a Chinese name entry using parent appliance 102 in conjunction with language module 104. This feature is very similar to character creation for plain text except that the word association tables are exchanged for name associations and most likely characters are biased towards names usage rather than plain language. This simplifies the task, then, of inserting names into text since the task has the potential for becoming tedious otherwise. Parent appliance 102 issues the 0x FB SetName( ) command to the module. In response, language module 104 repopulates the character and component buffers. The remainder of Chinese name entry using parent appliance 102 and language module 104 is analogous to the creation of Chinese text described above except that name contextual relationships drive character likelihoods rather than ordinary language contextual relations.

It is important that parent appliance 102 resets language module 104 to the word mode default using the 0x FA SetWord( ) command after name data has been gleaned. Failure to do this leads to user confusion. Since text operation is more usual, it is suggested that operation in name space be flagged aggressively to the user, e.g., in a display of parent appliance 102.

The following are a few examples of interaction between parent appliance 102 and language module 104. It is assumed that parent appliance 102 implements all user input and display features such that language module 104 does not require any specific knowledge of the hardware configuration of parent appliance 102. Assume that parent appliance 102 displays five (5) characters at a time and six (6) components at a time and that the Big5 Chinese character set is used. In this example, a user input field displayed by parent appliance 102 allows all strokes or phonetic items to be displayed to the user. Table E illustrates interaction between parent appliance 102 and language module 104 in initialization at power-up. Each row in the following tables represents a sequential even in the interaction illustrated between parent appliance 102 and language module 104.

TABLE E

| Parent Appliance State/Action | Command to Language Module | Response from Language Module | Language Module State/Action |
|---|---|---|---|
| Self initialization completed. | | | Default state. |
| Start language module. | Reset( ) | | Default state. |
| Language setup. | SetLangBig5( ) | | Current Language is now Big5 |
| Set component storage depth | SetCompNum(12) | | Component buffer depth is now 12 |
| Set character storage depth | SetCharNum(10) | | Candidate buffer depth is now 10 |

Language module 104 is now set to operate in the traditional language and following the receipt of the last two instructions, populates the character and component buffers with the number of entries specified. It should be noted that it is not always most efficient to allow language module 104 to store the maximum numbers of components and characters since this slows down operation of language module 104 and consumes additional power. As a practical consideration, there is no substantial advantage to having the buffers hold more than twice the respective numbers of characters and components that parent appliance 102 can display at any one time.

Parent appliance 102 subsequently retrieves the contents of the character buffer to display to the user upon startup the most frequently used characters of the Big5 Chinese character set as represented in Table F.

TABLE F

| Parent Appliance State/Action | Command to Language Module | Response from Language Module | Language Module State/Action |
|---|---|---|---|
| Get five (5) characters | GetChar(5) | | Prepare to send the first five entries of the character buffer |
| Read the resulting byte-stream Check for incomplete byte stream | | Five byte pairs | |
| Render the n<sup>th</sup> character (initially the first character) | GetFont(addr n++) - "n++" indicates that n is incremented after the font lookup | | |
| | | BadString code or bit-map data | Determine whether the request for font data is valid |

TABLE F-continued

| Parent Appliance State/Action | Command to Language Module | Response from Language Module | Language Module State/Action |
|---|---|---|---|
| Check for BadString code | | | |
| Check that all 32 bytes were received | | | |
| Display bit-map of the character | | | |
| Return to the Rendering step if n<6 (i.e., if less than all six (6) of the characters have been rendered) | | | |

Parent appliance 102 performs an analogous task to display the components using the GetComp(addr) command. It is important to check for error conditions and especially the occurrence of zero-valued byte pairs which are used by language module 104 to terminate a stream when there are no more valid candidates. If this is not done, then issuing the zero-valued pair as an address entry for font data retrieval and subsequent rendering will itself cause an error condition in language module 104.

Finally, parent appliance 102 must set the indexing mode which will be used for the creation of the next character. It is not useful to mix index entry methods so, as a safeguard, the indexing mode can only be set following the ClearInputBuffer( ) command before the first entry is submitted for entry into the input buffer. Other commands which do not affect the user input buffer may be interspersed between user input data submissions. The following example is illustrative. Once user input data is send to language module 104 in the stroke indexing mode, parent appliance 102 cannot send user input data to language module 104 in any other indexing mode until the input buffer is cleared.

TABLE G

| Parent Appliance State/Action | Command to Language Module | Response from Language Module | Language Module State/Action |
|---|---|---|---|
| Prepare for stroke indexing method | ClearInputBuffer( ) | | Input buffer is cleared; awaiting input data. |
| Send first user input data in stroke mode | StrokeMode($n_0$) | | Stroke value $n_0$ appended to input buffer |

TABLE G-continued

| Parent Appliance State/Action | Command to Language Module | Response from Language Module | Language Module State/Action |
|---|---|---|---|
| Check for error code repeat rendering of candidates and components in the manner described above | | | |
| Send next user input data | StrokeMode($n_1$) | | Stroke value $n_1$ appended to input buffer |
| Send next user input data but in PinYin mode | PinYinMode($n_1$) | | Invalid mode - ignore the command and flag the error |
| Check for error code | | BadRequest | State unchanged |
| Prepare for PinYin indexing method | ClearInputBuffer | | Input buffer is cleared; awaiting input data |
| Send user input data again in PinYin mode | PinYinMode($n_j$) | | PinYin value $n_j$ appended to input buffer |
| continue user input storage in PinYin mode | | | |

Table H below illustrates use of the context of previously specified characters to efficiently select candidates representing continuation of multi-character words. Prior to the interaction represented in Table H, the user has selected a character from a previous candidate list and continues to enter text. In addition, language module 104 has been set to word association mode by use of the SetWord( ) instruction by parent appliance 102. It should be appreciated that users tend to quickly adapt to word association mode which should therefore be used nearly all of the time.

TABLE H

| Parent Appliance State/Action | Command to Language Module | Response from Language Module | Language Module State/Action |
|---|---|---|---|
| Prepare for establishing indexing mode | ClearInputBuffer( ) | | Input buffer is cleared; waiting for input data |
| Set word mode | SetWord( ) | | Ordinary word context influences future candidate selection |
| Clear word buffer Send previously selected character(s) for storage in word | ClearWordBuffer( ) SetWordBuff(n) | | Starting mode Looking for n address pairs, each representing a |

TABLE H-continued

| Parent Appliance State/Action | Command to Language Module | Response from Language Module | Language Module State/Action |
|---|---|---|---|
| buffer | | | previously selected character |
| | {address 1..n} | | Store the n characters in the word buffer |
| Send user input data | PinYinMode(k) | | Store component associated with key k in input buffer Select candidates according to input buffer and word buffer |
| Retrieve the character candidates | GetChar(5) | | Pop first five (5) byte pairs from the candidate buffer |
| | | {five byte pairs} | |

This operation is similar to ordinary character specification by the user except that candidates are selected by language module 104 taking word continuation characters immediately following the previously selected character. After the second character is selected by the user, both characters—the first and second selected characters—are submitted to language module 104 for inclusion in the word buffer.

The above description is illustrative only and is not limiting. For example, while text messaging using a mobile telephone is described as an illustrative embodiment, it is appreciated that text entry in the manner described above is equally applicable to many other types of text entry. Mobile telephones use text entry for purposes other than messaging such as storing a name of the mobile telephone's owner and associating textual names or descriptions with stored telephone numbers. In addition, devices other than mobile telephones can be used for text messaging, such as two-way pagers and personal wireless e-mail devices. Personal Digital Assistants (PDAs) and compact personal information managers (PIMs) can utilize text entry in the manner described here to enter contact information and generally any type of data. Entertainment equipment such as DVD players, VCRs, etc. can use text entry in the manner described above for on-screen programming or in video games to enter names of high scoring players. Video cameras with little more than a remote control with a numeric keypad can be used to enter text for textual overlays over recorded video. Interchangeable language-specific text entry in the manner described above can even be used for word processing or any data entry in a full-sized, fully-functional computer system.

Therefore, this description is merely illustrative, and the present invention is defined solely by the claims which follow and their full range of equivalents.

What is claimed is:

1. A language processing device comprising:
   a processing and memory module which is physically attachable to and detachable from mobile electronic device, wherein said processing and memory module is configured to communicate directly with the mobile electronic device when so attached without the use of a network which extends outside the mobile electronic device, wherein said processing and memory module is configured with a plurality of discrete memory locations comprising each of:
      a settings memory containing data representing operational parameters including each of:
         a language setting comprising one or more language selected by the user of said language processing device; and
         an input mode setting comprising one or more input mode selected by the user of said language processing device; and
      an input buffer containing data representing key strokes used in specifying a message unit;
      a candidate buffer configured for storing candidate interpretations of user input gestures;
      a word buffer configured for storing message units specified by said user;
      a component buffer configured for storing data components of message units;
      an input interpretation database containing input gesture data; and
      a font store containing data representing properly represented characters;
   and wherein said processing and memory module is configured to perform language-specific tasks at the request of the appliance by:
      receiving an instruction for language-specific processing from the appliance in the form of an application program interface (API) call, wherein said API call references said plurality of discrete memory locations; and
      sending resulting data of the language-specific processing to the appliance.

2. The language processing device of claim 1 wherein the language processing and memory module is configured to perform language-specific tasks according to a subject language at the requests of the mobile electronic device by also:
   receiving data representing a character in the subject language; and
   sending data specifying a graphical representation of the character to the mobile electronic device.

3. The language processing device of claim 1 wherein the language processing and memory module is configured to perform language-specific tasks according to a subject language at the request of the mobile electronic device by also:
   receiving data representing a user input gesture; and
   sending data representing one or more language units of the subject language in accordance with the user input gesture.

4. The language processing device of claim 3 wherein the language units are characters.

5. The language processing device of claim 3 wherein the language units are words.

6. The language processing device of claim 3 wherein the language units are phrases.

7. The language processing device of claim 3 wherein sending comprises:

selecting the one or more language units according to one or more preceding language units which were previously specified by the user.

8. The language processing device of claim 7 wherein selecting comprises:

determining word-continuation relationships between the preceding language units and the one or more language units.

9. The language processing device of claim 7 wherein selecting comprises:

determining name-continuation relationships between the preceding language units and the one or more language units.

10. The language processing device of claim 3 wherein the language processing and memory module is configured to perform language-specific tasks according to the subject language at the request of the mobile electronic device by also:

sending data representing one or more language unit components which are of the subject language and which correspond to the user input gesture.

* * * * *